United States Patent [19]
Schritz

[11] Patent Number: 5,410,985
[45] Date of Patent: May 2, 1995

[54] POULTRY INCUBATOR AND METHOD
[75] Inventor: Bryan J. Schritz, Spencer, Ohio
[73] Assignee: Chick Master Incubator Company, Medina, Ohio
[21] Appl. No.: 823,192
[22] Filed: Jan. 21, 1992
[51] Int. Cl.6 .............................................. A01K 41/00
[52] U.S. Cl. ...................................................... 119/37
[58] Field of Search ................................ 119/35, 37, 39

[56] References Cited
U.S. PATENT DOCUMENTS

| | | | |
|---|---|---|---|
| 1,262,860 | 4/1918 | Smith | 119/35 |
| 1,567,006 | 12/1925 | MacKay et al. | 119/35 |
| 1,749,697 | 3/1930 | Egan | 119/39 |
| 1,861,895 | 6/1932 | Allen | 119/35 |
| 1,890,610 | 12/1932 | Karthaus | 119/35 X |
| 1,918,939 | 7/1933 | Sturgis . | |
| 1,983,055 | 12/1934 | Sturgis | 119/35 |
| 2,021,479 | 11/1935 | Bundy | 119/35 X |
| 2,026,801 | 1/1936 | Ross | 119/35 |
| 2,111,336 | 3/1938 | Schlottmann | 119/35 |
| 2,176,454 | 10/1939 | Scudder . | |
| 2,203,335 | 6/1940 | Lager | 119/35 |
| 2,319,091 | 5/1943 | Smith et al. | 119/37 |
| 2,439,145 | 4/1948 | Porter | 119/35 |
| 2,479,030 | 8/1949 | Taggart | 119/39 X |
| 2,526,939 | 10/1950 | Edwards | 119/37 X |
| 2,646,930 | 7/1953 | Dryden . | |
| 2,667,857 | 2/1954 | Smith | 119/37 X |
| 2,791,199 | 5/1957 | Hamnett | 119/35 |
| 2,864,336 | 12/1958 | Hamnett | 119/35 X |
| 3,006,320 | 10/1961 | Bailey | 119/37 |
| 3,389,688 | 6/1968 | Springer | 119/35 |
| 3,396,703 | 8/1968 | Trussell | 119/35 X |
| 3,505,735 | 4/1970 | Breuning | 119/39 X |
| 3,820,507 | 6/1974 | Dugan et al. | 119/35 |
| 3,938,472 | 2/1976 | Jauneaud | 119/37 |
| 4,183,325 | 1/1980 | Destouches | 119/37 |
| 4,274,364 | 6/1981 | Forseth | 119/35 |
| 4,501,228 | 2/1985 | Hinds | 119/37 |
| 4,606,299 | 8/1986 | Grumbach | 119/35 |
| 4,957,066 | 9/1990 | Dambre | 119/37 X |
| 5,005,523 | 4/1991 | Foster | 119/37 |

Primary Examiner—Robert P. Swiatek
Attorney, Agent, or Firm—Watts, Hoffmann, Fisher & Heinke Co.

[57] ABSTRACT

An improved fan panel promotes complete air circulation within in an egg incubator. Hinges secure the improved fan panel to support channels. Latches secure the opposite panel side to another support channel. The channels are secured to and in spaced relationship with the incubator roof section to define upper air passages. The panel, when secured, is spaced from the channels to define lower air passages which, together with the upper air passages, promote the circulation of virtually all the air from the incubation chamber into the environmental control and ventilation system. The improved fan panel disposition substantially prevents air from stagnating without reentering the environmental control and ventilation system.

7 Claims, 5 Drawing Sheets

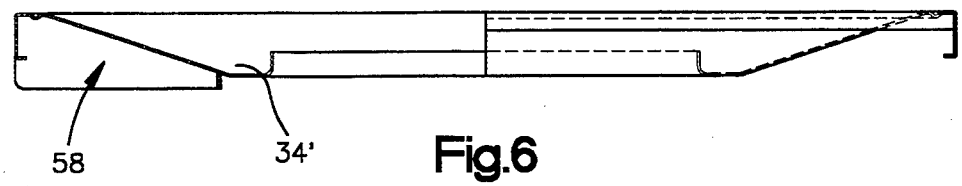
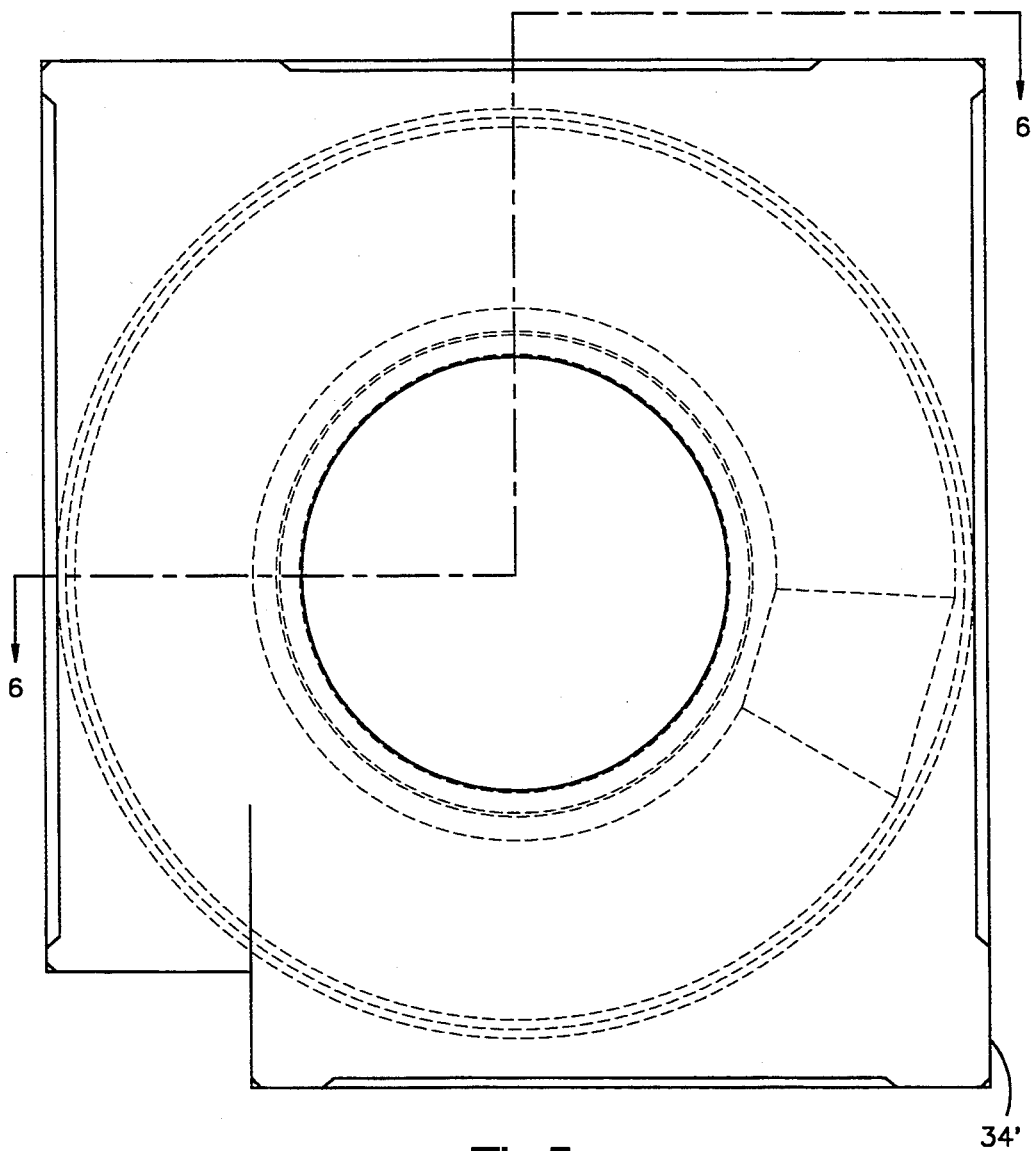

POULTRY INCUBATOR AND METHOD

FIELD OF INVENTION

This invention relates to a poultry incubator with an improved environmental control and circulation system within the incubator. More specifically, this invention relates to an improved air circulation system and a method of retrofitting an existing incubator to improve air circulation.

BACKGROUND ART

In order to control the temperature of eggs to achieve uniform hatching within an incubator, the environment within the incubator is regulated during egg incubation through the use of sensors which monitor temperature and humidity. Heating and cooling elements, as well as humidifiers, are provided to substantially control the internal incubator atmosphere. When the temperature exceeds a given range, the cooling element is activated to lower the ambient temperature. When the temperature falls below the desired range, the heating element is activated to raise the ambient temperature. Other environmental characteristics, such as humidity levels, are controlled in like manner.

If a hatch is to be optimized, it is important to have uniform and closely controlled egg temperatures throughout the incubator so that, at least ideally, the eggs hatch simultaneously. Accordingly, the heating and cooling elements, humidifiers and ventilation apparatus, components of an environmental control and circulation system, are usually centrally mounted within an incubator to optimize distribution of the system output. The circulation apparatus, i.e. fans and blowers, are intended to circulate the regulated air throughout the incubator to regulate egg temperature, thereby simulating or improving upon natural hatch conditions.

Unfortunately, maintaining uniform egg temperatures within an incubator by circulating regulated air has proven difficult. It has been discovered that in many instances, the air currents recirculate around some of the uppermost eggs without passing through the environmental control and circulation system, thereby creating temperature differentials between the uppermost and lowermost eggs on the order of one degree Fahrenheit (1° F.). Such a temperature differential is well beyond desired limits, adversely affecting the hatch. If the time frame over which a hatch occurs is excessive, one result is that earlier hatched chicks dehydrate. To minimize the chick dehydration problem, often the hatch must be interrupted before all hatching occurs, thereby reducing hatch efficiencies.

SUMMARY OF THE INVENTION

An improved fan panel is provided to promote complete air circulation within in an egg incubation chamber having a plurality of incubation portions for the incubation of eggs.

Hinges secure the improved fan panel to support channels. Latches secure the opposite panel side to another support channel. The channels are secured to and in spaced relationship with the incubator roof section to define upper air passages. The disposition of the panel, when secured, is spaced from the channels to define lower air passages which, together with the upper air passages, promote the circulation of virtually all the air from the incubation chamber into the environmental control and circulation system. The improved fan panel disposition substantially prevents air from stagnating without reentering the environmental control and circulation system.

Accordingly, the objects of the invention are to provide a novel and improved environmental control and circulation system within an incubator, as well as a method of retrofitting existing incubators to improve existing circulation systems. These objects are achieved by disposing an improved fan panel within the incubator in spaced relationship with the incubator roof to promote uniform air circulation throughout the incubator. Other objects and a further understanding may be had by referring to the following description and claims taken in conjunction with the accompanying drawings.

BRIEF DESCRIPTION OF THE DRAWINGS

FIG. 5 is a plan view of the improved fan panel embodying this invention;

FIG. 6 is a sectional view of the fan panel of FIG. 5, as seen from lines 6—6 of FIG. 5.

BEST MODE FOR PRACTICING THE INVENTION

Figure 1:
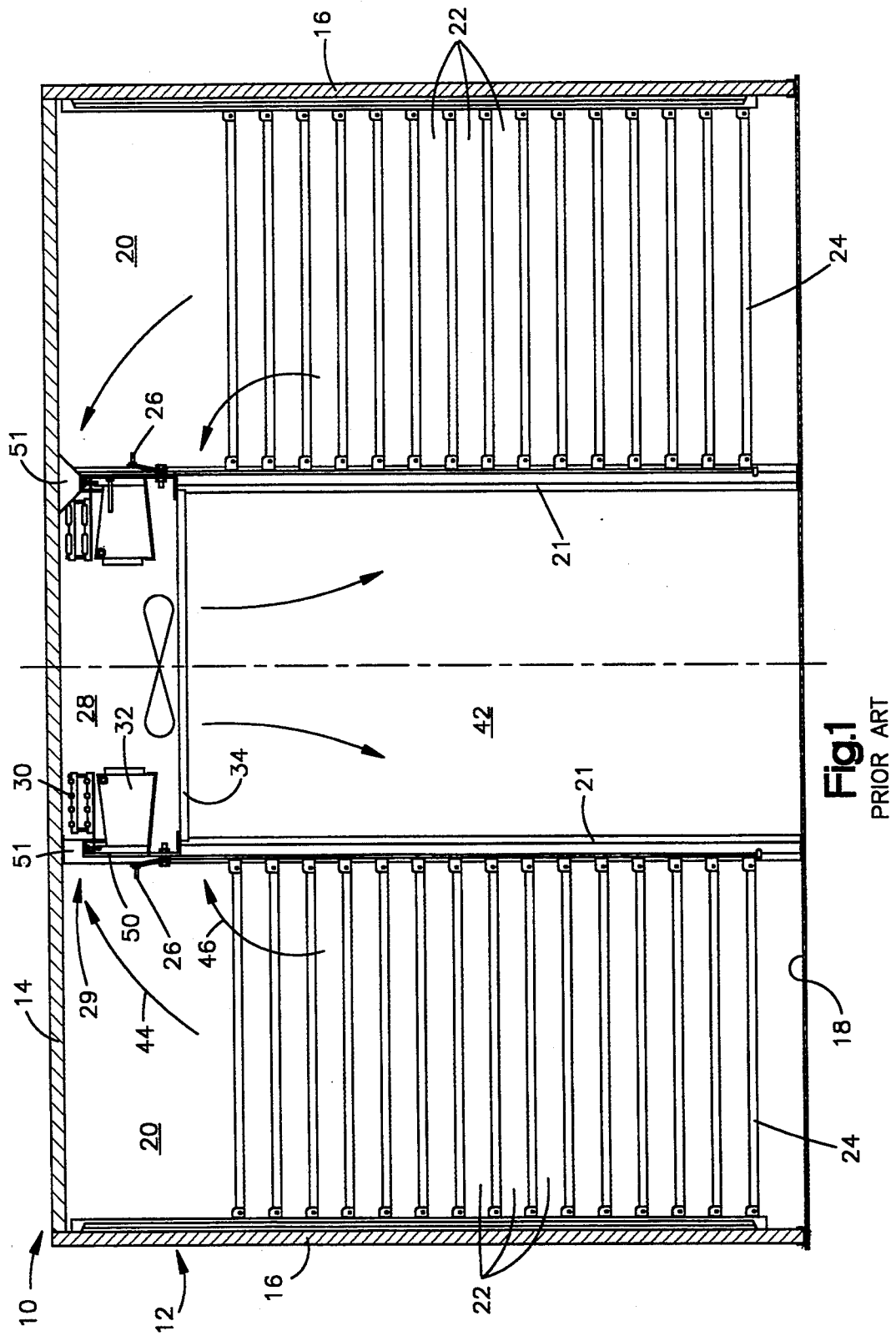
FIG. 1 is an elevational view of the interior of a prior art incubator.

Referring to FIGS. 1–4, an egg incubation apparatus 10 includes a housing 12 which is comprised of a roof 14, side walls 16 and a floor portion 18. The interior of the incubation apparatus 10 includes a chamber having spaced incubation portions 20 respectively delineated by the side walls 16 and interior walls 21. A plurality of egg tray spaces 22 are provided within the chamber portions 20. Trays, not shown, are supported in the spaces 22 by tray supports 24. A spaced pair of rocker arms 26 are respectively disposed within the chamber portions 20. Each rocker arm 26 interacts with its associated tray supports 24 to rock the tray supports periodically during the incubation period.

The temperature, humidity and other environmental factors are controlled through a centrally located environmental control and circulation section 28 which circulates environmentally regulated air throughout the incubator 10. The environmental control and circulation section generally includes humidifier (not shown), cooling coils 30, heater coils 31 (FIG. 3), air conditioning ducts 32 and a fan panel 34. The fan panel 34 includes a fan assembly 36 to circulate regulated air throughout the chamber portions 20.

In operation, sensors (not shown) periodically monitor the characteristics of the air within the housing 12. If the atmosphere is too cool, the heating element 31 is activated to warm the air. If the air is too warm, cooling coils 30 are activated. The humidity within the housing 12 is regulated in like manner.

Figure 2:
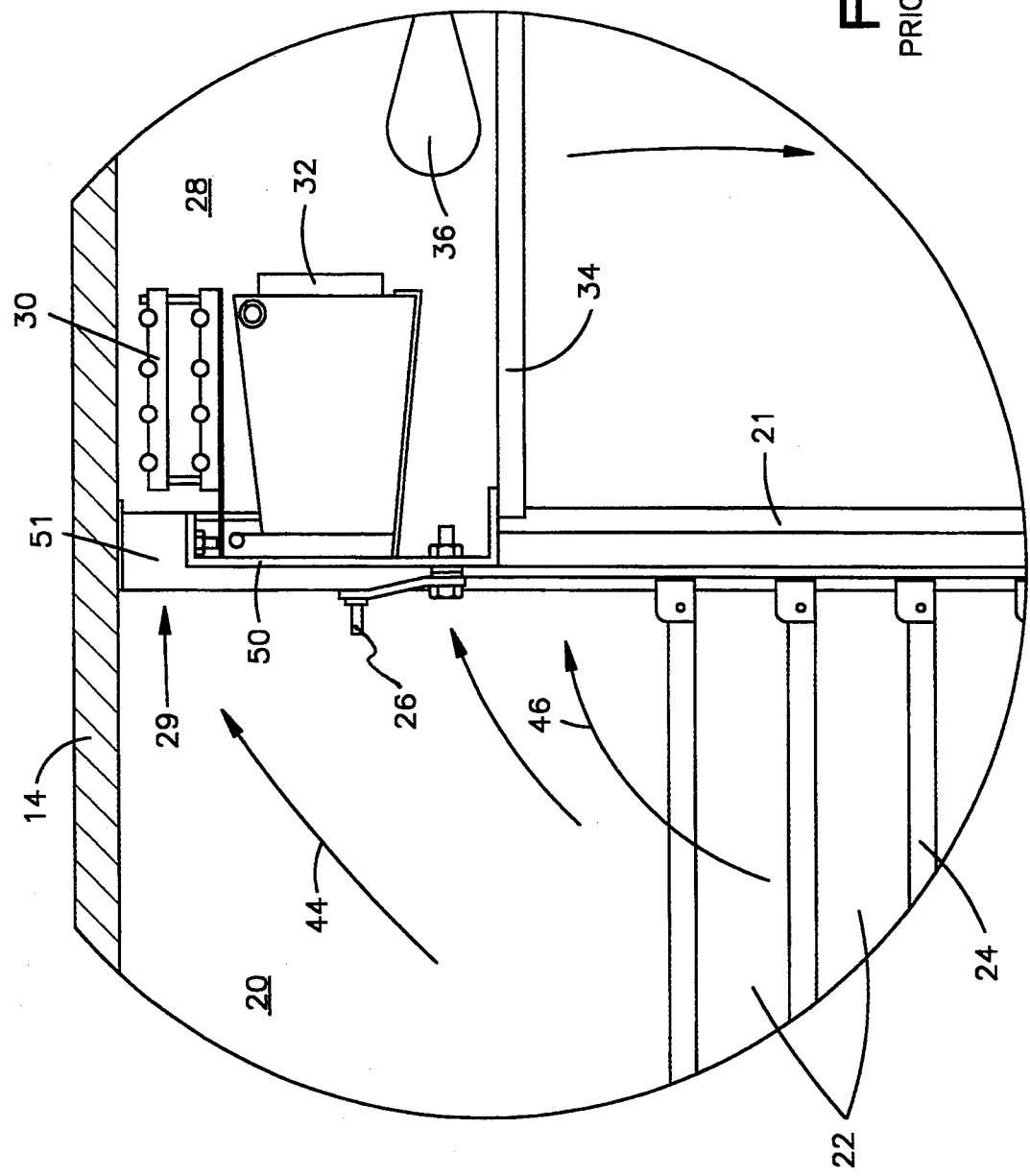
FIG. 2 is an exploded view of a section of the incubator of FIG. 1.

In the prior art, as shown in FIGS. 1 and 2, the fan panel 34 provides the lower boundary of the environmental control and ventilation section 28. The panel 34 is secured to support channels 50 such that the panel ends are disposed in abutting relationship with the inner walls 21 below the channels 50. The channels 50 are secured to the roof 14 via spacers 51 such that the spaced relationship between the channels 50 and the roof 14 defines upper inlet passages 29.

To regulate the air, it is drawn over the cooling coil 30 or through the ducts 32 by the fan assembly 36 and dispersed downwardly into incubator midsection 42 between the inner walls 21. As regulated air is pushed downward into the midsection 42 by the fan assembly 36 and drawn up from the incubation chamber portions 20, as illustrated generally and indicated by arrows 44,46 upper and lower air currents are created. The upper air current 44 draws air from the chamber portions 20 and into and through the environment control and ventilation section 28 through the upper inlet passages 29. With the prior art machine of FIG. 1 it has been discovered that the lower currents 46 stagnate.

Figure 3:
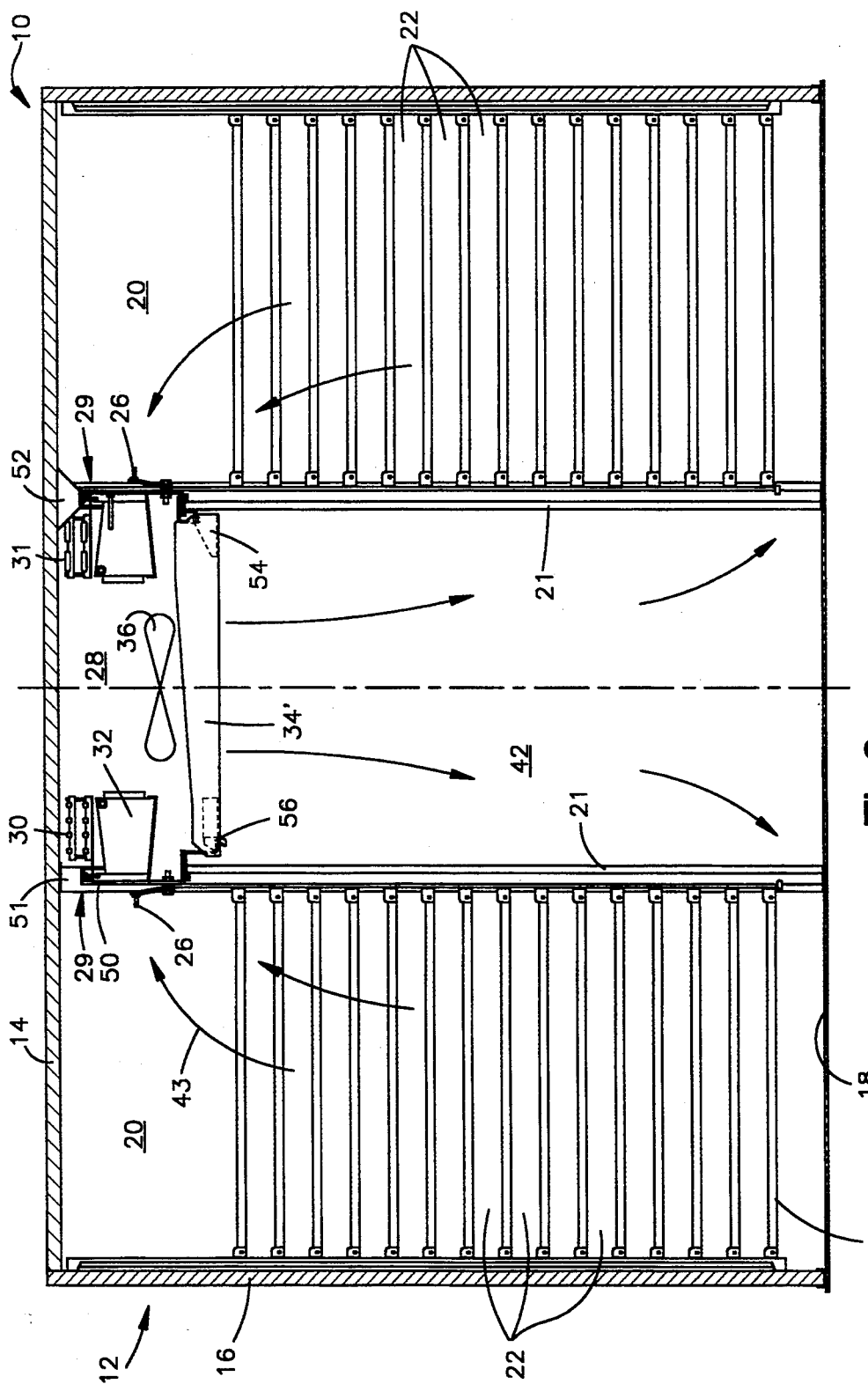
FIG. 3 is an elevational view of the interior of the incubator embodying the present invention.

As illustrated in FIGS. 3-6, an incubator embodying the present invention overcomes the stagnation problem. As shown in FIG. 3, the incubator apparatus 10 is substantially identical to that shown in FIGS. 1-2 other than for the construction and positioning of a modified fan panel 34'.

Figure 4:
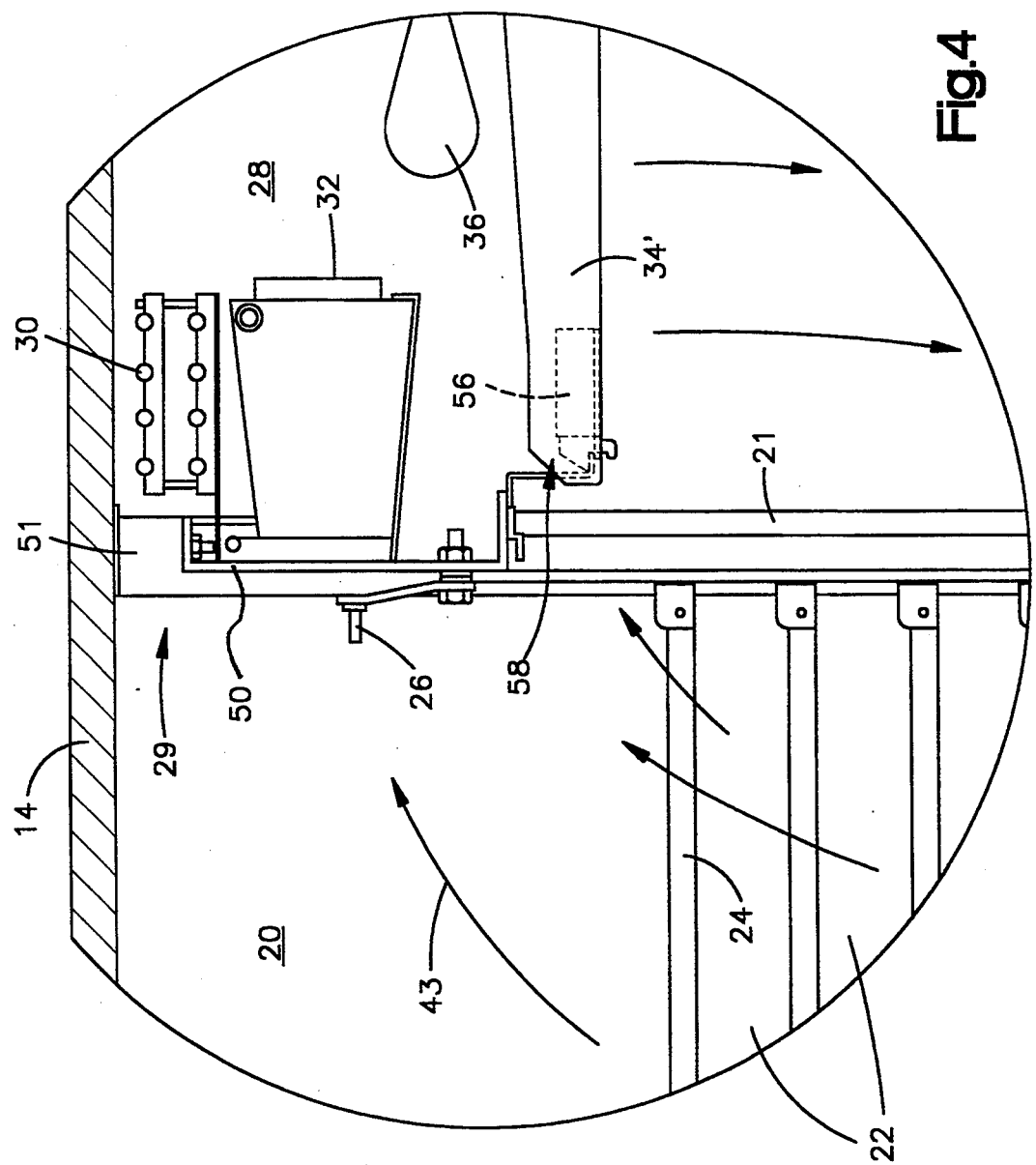
FIG. 4 is an exploded view of a section of the incubator of FIG. 3.

As shown in FIGS. 3 and 4, the cooling coils 30 and the air conditioning ducts 32 are secured to a pair of support beams 51, 52 which form a portion of the incubator roof 14. The support beams 51, 52 are secured to the roof 14 in spaced relationship to define inlet passages 29. A modified hinge 54 and latch 56 mechanism secures the modified fan panel 34' to the beams 51, 52 in a horizontal orientation a predetermined distance below and spaced from the beams 51, 52. Once secured, the modified hinge 54 and latch 56 mechanism, the panel 34' and the beams 51, 52 define lower air passages 58 which direct air from the chamber portions 20 along with the upper passages 29 into the environmental control and circulation section 28.

In operation, air is regulated by passing over the cooling coil 30 or through the duct 32 as it is drawn by the fan assembly 36. The air is then dispersed downwardly by the fan assembly 36 through the aperture of the modified panel 34' into the incubator midsection 42. At the same time, the fan assembly 36 draws air from upper parts of the incubation chamber portions 20. The upper air currents illustrated by the arrow 44 pass air through the upper passages 29 and into the environmental control and ventilation section 28. The lower air currents illustrated by the arrow 46 flow through the lower air passages 58 into the environmental control and ventilation section 28. The upper and lower air currents 44, 46 are combined as they are drawn in by the fan assembly 36 and expelled downwardly into the incubator midsection 42.

Retrofitting a prior art incubator is accomplished by removing the fan panel 34. The panel support structure is modified by securing the modified hinge 54 and latch 56 mechanism to the beams 51 and 52. The modified hinge and latch mechanism is then secured to the improved fan panel 34' such that the panel 34' is suspended in a horizontal orientation a predetermined distance below and spaced from the beams 51, 52 to define the lower air passages 58.

While a preferred embodiment of the invention has been described with particularity, modifications or alterations may be made therein without departing from the spirit and scope of the invention set forth in the appended claims.

What I claim is:

1. An egg incubation apparatus having an enclosure including a roof and sides defining a chamber having spaced portions for storing, supporting and incubating eggs supported by trays, and an environmental control and ventilation system section, disposed within the apparatus, to control the temperature of eggs positioned within said chamber, the improvement comprising:
   a. at least one fan panel disposed between said chamber portions and below said environmental control system section;
   b. a spaced pair of support channels delineating sides of the section, the channels being spaced below the roof to define upper air entrance passageways to the section;
   c. at least one hinge and at least one latch, the at least one hinge being secured to said at least one panel and to at least one of the support channels, said at least one panel having a latch end secured to said at least one latch for securement to the other of the support channels, the at least one hinge and the at least one latch supporting the panel in spaced relationship such that the panel and support channels define lower air passages for circulation of air from said incubation chamber portions into said section;
   d. a fan assembly supported by the at least one panel;
   e. said at least one fan panel having an aperture for receiving output from the fan assembly;
   f. said fan assembly being disposed in alignment with said aperture such that said fan assembly directs environmentally controlled air downwardly from the assembly through the aperture towards said incubation chambers.

2. The apparatus of claim 1 wherein the at least one fan panel directs circulated air from said incubation chamber portions to said environmental control and ventilation system section through upper and lower air passages defined by the disposition of said at least one fan panel, and said support channels.

3. An incubator environmental control and ventilation system disposed within a section of an incubator having roof, floor and wall portions defining at least one egg incubation chamber, said system substantially controlling the temperature, humidity and ventilation within said incubator, the improvement comprising:
   a. support means secured to the roof portion;
   b. an environmental control unit support beam secured to said support means and extending in a vertical direction toward the floor portion of said incubator;
   c. cooling means for regulating the ambient environment within said chamber, the cooling means being secured to said support beam;
   d. duct means secured to said support beam;
   e. a fan panel;
   f. hinge and latch means connecting said fan panel to said beam, said beam, hinge and latch means and said fan panel defining ventilation passages to promote air flow into said section; and,
   g. said fan panel being connected to at least one fan assembly to communicate air from said section downwardly towards said at least one chamber.

4. The fan panel of claim 3 further comprising ventilation means to direct air from said at least one incubator chamber through said passages into said environmental control and ventilation system section, said ventilation means being disposed near at least one perimetral edge of said panel.

5. A method of retrofitting an incubator comprising the steps of:
   a. removing a fan panel from its supports;
   b. connecting a modified latch and hinge means to said supports;
   c. securing a modified fan panel having vent means to said latch and hinge means such that the disposition of the supports and the modified fan panel define a channel to promote the flow of air from at least one incubation chamber section to at least one environment control and ventilation section.

6. In a chicken incubator having a housing including roof and wall structure defining an incubation chamber, an improved environmental control circulation system comprising:
   a. a spaced pair of channels defining the sides of a generally centrally located environmental control section, the channels being spaced from the roof structure to delineate upper air inlet passages;
   b. an apertured panel delineating the bottom of said environmental control section, the panel being connected to the channels in spaced relationship to delineate lower air inlet passages;
   c. a circulating fan positioned within the section and located such that it draws inlet air through each of said inlet passages and directs air outwardly through a panel aperture; and
   c. said fan having sufficient capacity to direct outlet air downwardly into lower portions of the incubation chamber and laterally into incubation chamber portions on either side of said aperture whereby air is caused to flow into and upwardly through trays of incubating eggs positioned in the portions on either side laterally speaking of said aperture, the air being drawn upwardly over the eggs and thence, into and through each of the lower and upper inlet passages.

7. In a egg incubator having wall and roof structures defining an incubating chamber, a method of improving air circulation in the incubator when in use comprising:
   a. disconnecting a panel delineating the bottom of an environmental control section from a panel support structure including a spaced pair of channels delineating sides of that section;
   b. maintaining the channels in the spaced relationship with the roof to continue to delineate upper air inlet passages to the environmental control section from incubation spaces on either side thereof;
   c. modifying the panel support structure and thereafter connecting a modified panel to the channels with the modified support structure maintaining the panel below and in spaced relationship with the channels to create a second pair of inlet passages into the said environmental control section whereby to eliminate stagnant atmospheric volumes in the incubation chamber portions to either side laterally speaking of the environmental control section.

* * * * *